No. 632,386. Patented Sept. 5, 1899.
F. L. WHITE.
DEAD CENTER.
(Application filed Mar. 14, 1898.)
(No Model.)
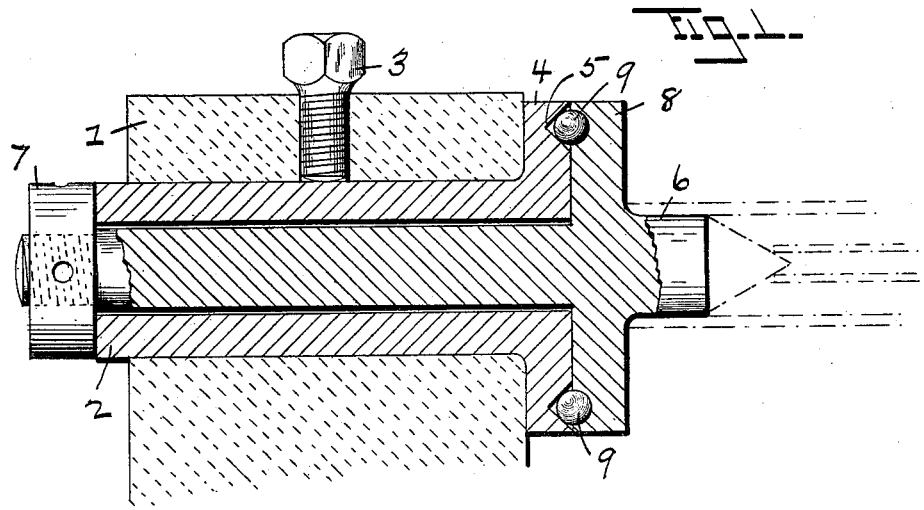
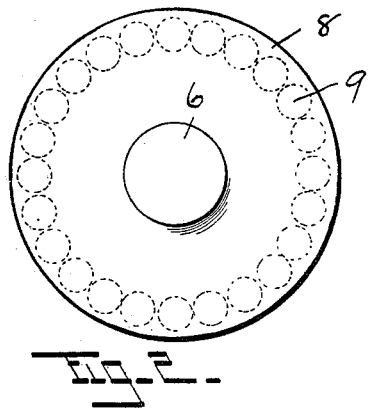
Witnesses.
Inventor.
Frederick L. White
by Chapman & Hall
Attorneys

UNITED STATES PATENT OFFICE.

FREDERICK L. WHITE, OF WATERBURY, CONNECTICUT, ASSIGNOR TO GEORGE H. CLOWES, OF SAME PLACE.

DEAD-CENTER.

SPECIFICATION forming part of Letters Patent No. 632,386, dated September 5, 1899.

Application filed March 14, 1898. Serial No. 673,791. (No model.)

*To all whom it may concern:*

Be it known that I, FREDERICK L. WHITE, a citizen of the United States, residing at Waterbury, in the county of New Haven and State of Connecticut, have invented a certain new and useful Improvement in Dead-Centers, of which the following is a specification, reference being had therein to the accompanying drawings.

My invention relates to the work-holding centers used on the turret-heads of lathes; and it has for its object to provide such a center with means for supporting the same of such construction that friction and wear thereof are reduced to a minimum, thereby greatly prolonging the effective life of the center and insuring accuracy of operation at all times.

To this end my invention consists in the construction and arrangement of parts hereinafter fully described, and particularly pointed out in the claim.

Referring to the drawings, in which like numerals designate like parts in both views, Figure 1 is a longitudinal section of a dead-center embodying my invention. Fig. 2 is an end view thereof.

The numeral 1 designates a portion of the turret-head of a lathe, and 2 designates a sleeve which enters a socket in said head and is held from rotation therein by a locking-screw 3. Said sleeve 2 is provided at its front end with an annular flange 4, which abuts against the face of the turret-head, and with an annular groove or recess 5 in the face of said flange.

The dead-center 6 passes loosely through the sleeve 2 and carries at its threaded rear end the spanner-nut 7. Near its front end said center is provided with the circular flange 8, the diameter of which corresponds with that of the flange 4 on said sleeve, in the rear face of which flange is an annular groove or recess which registers with the groove or recess 5, as shown in Fig. 1. Located within the annular grooves in said flanges is the continuous series of hardened steel balls 9, which are of slightly greater diameter than the combined depth of the two grooves, whereby they sustain the entire end thrust of the center. The action of the nut 7 prevents any forward movement of the center to release the balls from said grooves, while at the same time it leaves the center entirely free to revolve with the work which it engages.

At its front end the center 6 may terminate in a flat end, as shown by full lines in Fig. 1 and in Fig. 2, or in a conical end, as shown by broken lines in Fig. 1, both forms of centers being common, their manner of engaging the work being indicated by broken lines in Fig. 1.

The entire bearing and end thrust of the center being sustained by the balls 9, the center is not only adapted to revolve without appreciable friction, but is also given an effective life greatly exceeding in duration those now in use, while entire accuracy of its centering action is assured at all times.

One of the annular grooves or recesses described is preferably made of a V shape in cross-section, as shown of the groove 5 in Fig. 1, to lessen the frictional engagement of the series of balls with the walls thereof.

I am aware that it is old to insert a series of steel balls in a bearing to reduce the friction caused by the end thrust, as illustrated in the patent to W. H. McKenna, No. 490,918, and I do not therefore claim such construction broadly.

Having thus fully described my invention, what I claim, and desire to secure by Letters Patent, is—

In a device of the character described, the combination with a supporting-head, of a tubular sleeve having a collar upon one end, the rear face of which abuts against the said supporting-head and having an annular groove in the front face thereof, means, as a binding-screw, for rigidly securing said sleeve within said head, a dead-center having a collar adjacent to its front end of substantially the same diameter as the said sleeve-collar and having an annular groove in its rear face which registers with the groove in the said sleeve-collar, and a shank portion extending through the body of said sleeve and having a nut upon the rear end, whose diameter is substantially the same as the said sleeve, and a series of balls within the said groove, all constructed and operating substantially as described.

In testimony whereof I affix my signature in presence of two witnesses.

FREDERICK L. WHITE.

Witnesses:
GEORGE E. HALL,
EDWARD R. LEZOTT.